US006786103B2

(12) United States Patent
Kuhlemann et al.

(10) Patent No.: US 6,786,103 B2
(45) Date of Patent: Sep. 7, 2004

(54) WATER METERS TO BE MOUNTED IN THE PIPE CONDUITS OF A NOMINAL DIAMETER CLASS AND METHOD FOR OPERATING SUCH WATER METERS

(75) Inventors: Holger Kuhlemann, Sarstedt (DE); Karsten Nettemann, Hannover (DE); Eckhard Kuhn, Sehnde (DE)

(73) Assignee: Sensus Metering Systems GmbH Hannover, Laatzen (DE)

( * ) Notice: Subject to any disclaimer, the term of this patent is extended or adjusted under 35 U.S.C. 154(b) by 0 days.

(21) Appl. No.: 10/169,004

(22) PCT Filed: Oct. 18, 2001

(86) PCT No.: PCT/DE01/04015

§ 371 (c)(1),
(2), (4) Date: Sep. 16, 2002

(87) PCT Pub. No.: WO02/33359

PCT Pub. Date: Apr. 25, 2002

(65) Prior Publication Data

US 2003/0056604 A1 Mar. 27, 2003

(30) Foreign Application Priority Data

Oct. 20, 2000 (DE) .......................................... 100 52 274

(51) Int. Cl.[7] ............................................... G01F 1/12
(52) U.S. Cl. .................................................. 73/861.83
(58) Field of Search .......................... 73/861.83, 861.81, 73/861.91, 861.92, 861.82

(56) References Cited

U.S. PATENT DOCUMENTS 5,277,071 A * 1/1994 Pieper ...................... 73/861.83
5,877,430 A * 3/1999 Peace et al. ............. 73/861.82

FOREIGN PATENT DOCUMENTS

DE  2 002 856 A   2/1979
DE  32 06 433 A1  1/1983

* cited by examiner

Primary Examiner—Edward Lefkowitz
Assistant Examiner—Jewel V. Thompson
(74) Attorney, Agent, or Firm—Rick Martin; Patent Law Offices of Rick Martin P.C.

(57) ABSTRACT

The present invention relates to water meters for the installation in pipe lines of a nominal width-group and a method for operating such water meters, which operate according to the Woltmann principle. The present invention addresses the problem of avoiding the calibration expenditures for each of the nominal widths of the nominal width-group and the disadvantages entailed therein. The solution of this problem, stated generally, is that in the water meters at the relevant site, namely in the annular channel (16) directly in front of the impeller wheel (8), independently of the nominal width of the connected pipe line, a substantially rectangular velocity distribution (19) obtains with stream lines directed substantially parallel to the wall of the annular channel (16), with these flow conditions being substantially identical at identical throughflows.

7 Claims, 1 Drawing Sheet

WATER METERS TO BE MOUNTED IN THE PIPE CONDUITS OF A NOMINAL DIAMETER CLASS AND METHOD FOR OPERATING SUCH WATER METERS

CROSS REFERENCE APPLICATIONS

This application is a national phase application claiming priority from PCT application no. PCT/DE01/04015 filed on 18 Oct. 2001 and claiming priority from German application 100 52 274.2 filed on 20 Oct. 2000

FIELD OF INVENTION

The present invention relates to a water meter which can be used in a variety of nominal width pipelines without adjustment.

BACKGROUND OF THE INVENTION

Water meters, which operate according to the Woltmann principle are well known in the prior art. Some representative water meters are disclosed in WO 91/04462, DE 841 952, DE 37 32 703 A1, U.S. Pat. No. 3,811,323 and U.S. Pat. No. 3,999,432. Water meters need to be installed in pipe lines of differing nominal widths. In order not to have to manufacture water meters for each nominal width pipeline a measuring insert to adapt the water meter to a range of structural sizes can be provided. Nominal widths are combined into groups of nominal widths, in which like measuring inserts, i.e. measuring inserts identical in structural size and of identical construction, are employed. Thereby the production costs for the measuring inserts can be lowered.

According to prior art, the measuring inserts of one nominal width-group must be calibrated for each rated value. This entails various disadvantages. For one, the costs of calibrating are increased since equipment parts adapted to the different nominal widths are required. For another, servicing the measuring inserts is difficult since the operators of the meters frequently state incorrect nominal widths in the event of a service request. The service technician in this case either brings to the site of installation an incorrect measuring insert, i.e. one calibrated to another nominal width or, preventively, carries along several measuring inserts calibrated to various nominal widths of the nominal width-group. A further disadvantage is that warehousing costs increase for each group of nominal widths as a greater number of calibrated measuring inserts must be kept in readiness.

The present invention addresses the problem of eliminating the above listed disadvantages of prior art.

This problem is solved according to the present invention with water meters with a housing with aligned inflow region, outflow region, and a measuring insert disposed coaxially between them. The housing is identical for all nominal widths of the nominal width-group. Mounted inside the housing is a measuring annulus having a coaxially disposed an upstream holding means and a downstream holding means. Between the holding means an impeller wheel is rotatably supported, whose vanes project into an annular channel formed between the holding means and the measuring annulus. The inner contour of the inflow region and the outer contour of the upstream holding means are shaped such that, independent of the nominal width of the connected pipe line, in the annular channel directly in front of the impeller wheel a substantially rectangular velocity distribution is obtained. This results in stream lines directed substantially parallel to the wall of the annular channel, allowing accurate measurement of fluid flow.

Stated in general terms, the solution of this problem lies in that, independently of the nominal width of the connected pipe line, in the water meters at the annular channel directly in front of the impeller wheel a substantially rectangular velocity distribution is obtained with stream lines aligned substantially parallel to the wall of the annular channel. This results in flow conditions at identical flow rates in different sized pipes are substantially identical. Therefore only it is necessary to calibrate the measuring insert for one nominal width of the nominal width-group. It is the possible, without changing the adjustment and without repeated calibration, to use the water meter in each nominal width of the nominal width-group.

In one embodiment of the present invention the upstream holding means comprises a substantially perpendicular face of stream incidence, which transitions into a cylindrical or slightly conical diverging shell surface, which forms the inner wall of the annular channel, with the transition being shaped such that directly in front of the impeller wheel a substantially rectangular velocity distribution is obtained.

This formation contributes to the fact that even in the case of the smallest or the smaller nominal widths of the nominal width-group not only identical integrated flow velocities are present in front of the impeller wheel but also that uniform flow conditions obtain from which results a uniform flow against the vanes of the impeller wheel when viewed over the cross section of the annular channel.

SUMMARY OF THE INVENTION

The primary aspect of the present invention is to provide a water meter which can be used in a number of different sized pipelines without additional calibration.

Other aspects of this invention will appear from the following description and appended claims, reference being made to the accompanying drawings forming a part of this specification wherein like reference characters designate corresponding parts in the several views.

The present invention relates to water meters for the installation in pipe lines of the group of nominal widths from 50 to 100 mm. Part of this nominal width-group are the nominal widths conventionally and commonly used in practice of 50, 80 and 100 mm as well as, if appropriate, an additional fourth nominal width of 65 mm.

Figure 1:
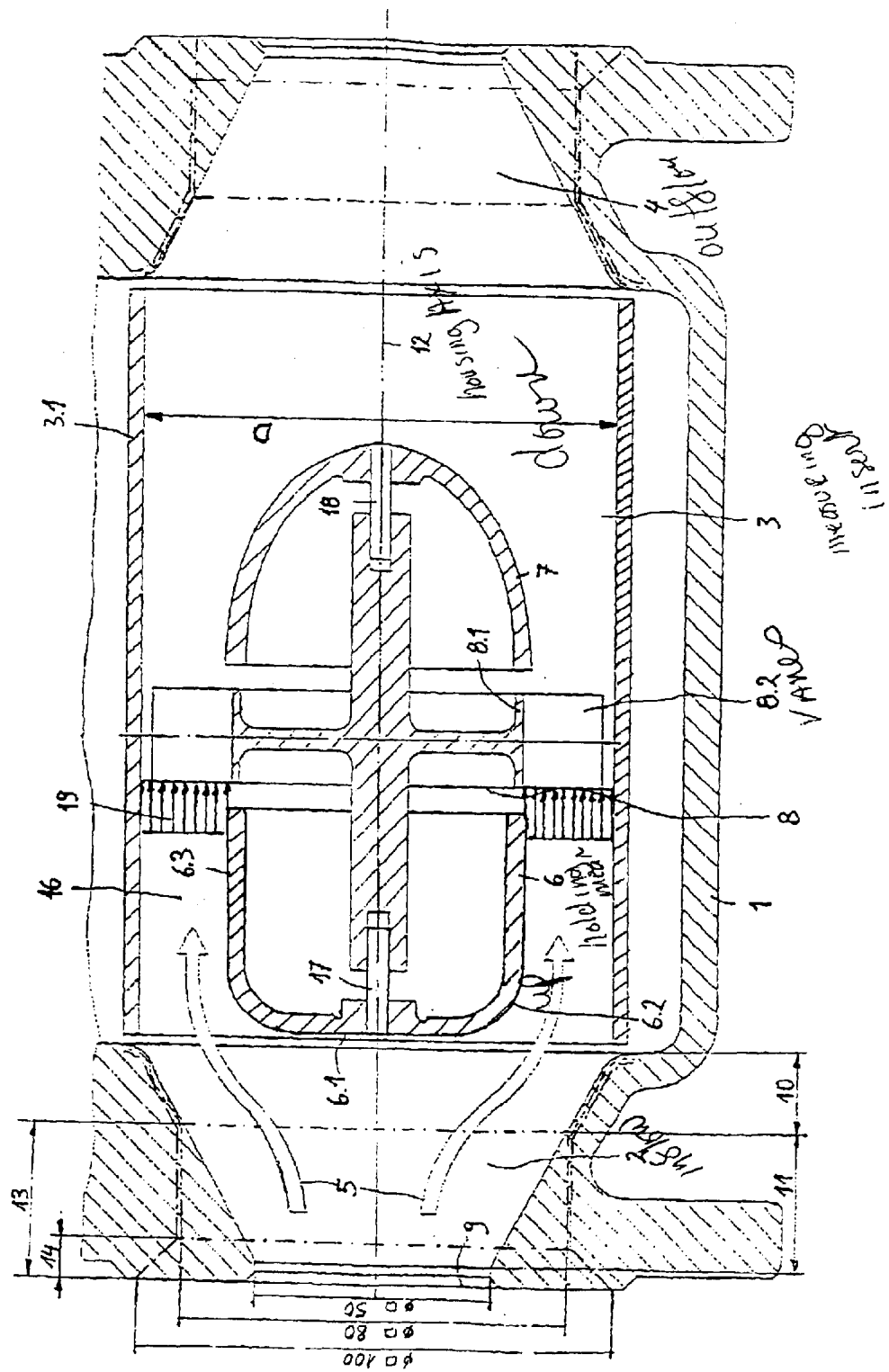
FIG. 1 is a longitudinal cross section of the preferred embodiment of the present invention.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWING

The sole FIGURE of the drawing depicts in schematic manner a longitudinal section through a water meter, whose housing 1 comprises an inflow region 2 and an outflow region 4. The flow regions 2, 4 are aligned with one another on a longitudinal housing axis 12 coaxially disposed between the inflow region 2 and the outflow region 4 is a measuring insert 3, which is a Woltmann meter in the preferred embodiment. The flow is in the direction of arrow 5. The measuring insert 3 is comprised of two eggcup-form holding means 6, 7. The holding means 6 is disposed upstream, thus is associated with the inflow region 2, while the holding means 7 is disposed downstream, and is thus located adjacent and opposite to the outflow region 4. The holding means 6, 7 are mounted with (not shown) stays on a measuring annulus 3.1. Between holding means 6 and 7 is disposed an impeller wheel 8, which comprises an impeller wheel hub 8.1 and vanes 8.2 distributed over the circumference. These vanes 8.2 project beyond the circumference of the holding means 6 and 7 into an annular channel 16 formed between the wall of the holding means 6 and 7 and the measuring annulus 3.1. The impeller wheel 8 is rotatably supported via pins 17, 18 on holding means 6 and 7, respectively. The rotational movement of the impeller wheel 8 resulting from the stream incidence of the water or other fluid flowing through the housing 1 is transmitted via a (not shown) shaft onto a meter also not shown, which is fastened above the measuring insert 3 on housing 1. The meter as well as also the transmission mechanism are within the scope of prior art, such that here more detailed or further explanations are unnecessary.

Housing 1 is provided for the connection to a pipeline with the nominal width of 50 mm. The inner contour of the inflow region 2 as well as the inner contour of the outflow region 4 are represented in solid lines for this meter. The inner contours of housing 1 for the connection to the pipelines having the nominal widths of 80 and 100 mm are drawn in this drawing in dot-dash lines in order to make further graphic representations superfluous.

Common to the water meters of the nominal width-group is a first zone 10 of the inner contour of the inflow region 2, which is adjacent to the holding means 6 of measuring insert 3. Zone 10 conically tapers in the direction of, and opens into, inflow origin 9 with diameter D, which is approximately the diameter of the annular channel 16.

For the smallest nominal width of 50 mm this first conical zone 10 continues as a second conical zone 11 up to the inflow origin 9 of water meter.

In the case of the water meter for a mean nominal width of 80 mm, adjoining the zone 10 adjacent to the holding means 6 of the measuring insert 3 is a zone 13. Zone 13 extends up to the inflow origin 9 parallel, or nearly parallel, to the longitudinal axis 12 of the meter, of the inner contour of inflow region 2. By parallel is also understood a nearly parallel extension which can be present for reasons, for example, of casting.

Apart from the three nominal widths of 50, 80 and 100 mm, in the nominal width-group of the preferred embodiment a further mean nominal width of 65 mm can also occur. In this case, similar to the nominal width of 80 mm, an inner contour can result, which extends parallel or nearly parallel to the longitudinal axis 12 of the meter, adjoins zone 10 but is adjusted in accordance with the nominal width of 65 mm.

For the greatest nominal width of 100 mm the zone 13, extending parallel, or mostly parallel, to the longitudinal axis 12 of the meter, transitions into a conically flaring zone 14 before the inflow origin 9.

This inner contour of the inflow region 2 in the case of all of the water meters of the nominal width-group for the differing nominal widths is adapted such that the velocity of the flow in front of the impeller wheel is consistant for all of the water meters in the group. In the case of the smallest nominal width of 50 mm, the inner contour conically flaring from the inflow origin 9 decreases the velocity of flow up to the measuring insert 3. In the case of the water meter with the mean nominal width of 80 mm or in the case of the water meter with the nominal width of 65 mm, the velocity of flow is only decreased in zone 10. In the case of the water meter with nominal width 100 mm the velocity of flow in zone 14 is initially increased, subsequently is kept constant and in zone 10 is again decreased. Thereby, in cooperation with the holding means 6, uniform flow conditions, i.e. a substantially rectangular velocity distribution 19 with stream lines that are directed substantially parallel to the wall of the annular channel 16 can be attained directly in front of the impeller wheel 8.

The upstream holding means 6 forms a stream incidence body for the water flowing into the housing in the direction 5. The water stream is divided on holding means 6 and subsequently flows through the annular channel 16 in order to drive the impeller wheel 8. The holding means 6 comprises a perpendicular face of incidence 6.1, which transitions in a radius 6.2 into a slightly conically diverging shell surface. This development ensures that even with the smaller nominal widths, in particular with the smallest nominal width of 50 mm, the stream lines uniformly permeate the annular channel 16 directly in front of the impeller wheel 8 with substantially parallel direction to the wall of the annular channel 16.

In practice it is useful to develop the inner contour of the outflow region 4 such that it is identical to the inner contour of the inflow region 2.

The invention is not only applicable with the represented water meter but also with combination water meters, which are comprised of a main meter disposed in a main line for the acquisition of greater throughflows and a secondary meter disposed in a secondary line for the acquisition of smaller throughflows as well as a switch-over valve with a closure member effected counter to the flow 5, which, in the closed position, is in contact on a valve seat and enables or blocks the throughflow through the main water upon reaching a specific limit throughflow.

What is claimed is:

1. A water meter for the installation in pipe lines of a nominal width-group with successive nominal width, said water meter comprising:

a housing having an aligned inflow region and outflow region;

a measuring insert disposed coaxially between said regions, said measuring insert is identical for all nominal widths of the nominal width-group;

said measuring insert comprises a measuring annulus;

a coaxially disposed upstream and downstream holding means;

an impeller wheel rotatably supported between said holding means;

said impeller wheel having vanes which project into an annular channel formed between the holding means and the measuring annulus;

characterized in that the inner contour of the inflow region and the outer contour of the upstream holding means are developed such that, independently of the nominal width of the connected pipe line, in the annular channel directly in front of the impeller wheel a substantially rectangular velocity distribution obtains with stream lines directed substantially parallel to the wall of the annular channel;

wherein the upstream holding means comprises a substantially perpendicular face toward a stream incidence, which transitions into a cylindrical or slightly conically diverging shell surface having substantially parallel walls forming an inner wall of the annular channel; and wherein only a single calibration is needed for use in any member pipe of the nominal width-group.

2. The water meter of claim 1, characterized in that the transition is a radius.

3. The water meter of claim 1, wherein a first zone of the inner contour of the inflow region is adjacent to the upstream holding means and tapers in the direction toward the inflow origin and opens toward the holding means approximately with the diameter D of the annular channel; and wherein D is identical for all nominal widths of the nominal width-group.

4. The water meter of claim 3, wherein the conical taper of the first zone continues as a second tapering zone for the smallest nominal width of the nominal width-group up to the inflow origin and there ends with the smallest nominal width.

5. The water meter of claim 3, wherein adjoining the first zone for one or several mean nominal widths is a third zone of the inner contour extending up to the inflow substantially parallel to a longitudinal axis of the water meter, which ends there with the particular mean nominal width.

6. The water meter of claim 3, wherein adjoining the first zone for the greatest nominal width is a fourth zone, extending substantially parallel to the longitudinal axis of the water meter, of the inner contour, which transitions into a fifth zone flaring conically before the inflow origin) to the greatest nominal width.

7. A water meter for installation in pipe lines of a nominal width-group with successive nominal widths, wherein the water meter comprises;

a housing having an aligned inflow region and outflow region;

a measuring insert coaxially disposed between the flow regions which is identical for all nominal widths of the nominal width-group;

said measuring insert comprising a measuring annulus having coaxially disposed an upstream holding means and a downstream holding means rotatably supporting an impeller wheel;

said impeller wheel having vanes which project into an annular flow channel formed between the holding means and the measuring annulus;

characterized in that the water meter, directly in front of the impeller wheel forms a substantially rectangular velocity distribution with stream lines directed substantially parallel to the wall of the annular channel by means of a perpendicular face for the upstream holding means followed by substantially parallel walls for an upstream casing; and wherein only a single calibration is needed for use in any member pipe of the nominal width-group.

* * * * *